Sept. 8, 1931.  N. DE NAVROTZKY  1,822,804
APPARATUS FOR THE RECOVERY OF THE ALCOHOL EVOLVED BY BREAD BAKING OVENS
Filed Feb. 1, 1929
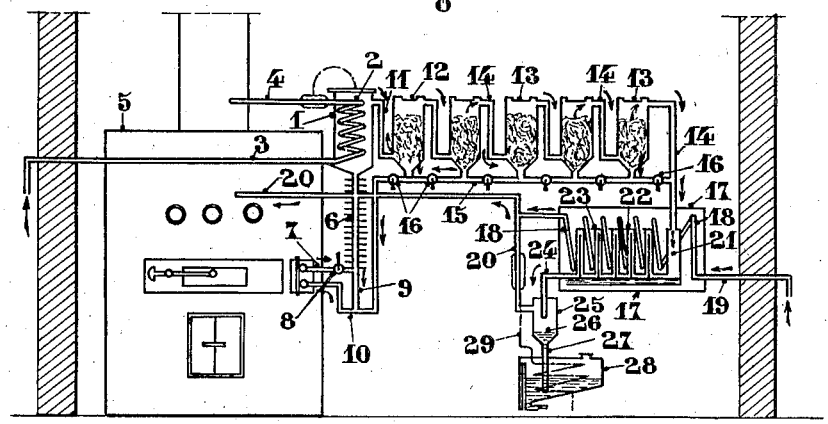
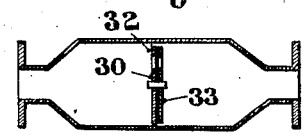
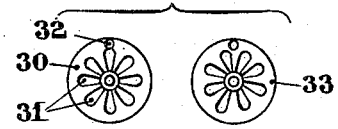
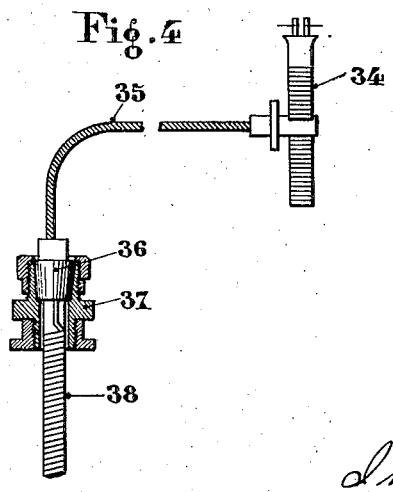

Patented Sept. 8, 1931

1,822,804

UNITED STATES PATENT OFFICE

NICOLAS DE NAVROTZKY, OF PARIS, FRANCE

APPARATUS FOR THE RECOVERY OF THE ALCOHOL EVOLVED BY BREAD BAKING OVENS

Application filed February 1, 1929, Serial No. 336,878, and in France February 2, 1928.

It is well known that a great amount of alcohol vapors developed inside of the oven during the baking of the bread escapes therefrom through the chimney.

For the recovery of these alcohol vapors, various types of apparatus have been designed which necessitate expensive, complicated and cumbersome plants and which furthermore have following drawbacks:

The recovered alcohol is of very low concentration which involves enormous expenses for the shipping of the dead weight represented by the water.

The continuous circulation of the water in the columns, tanks and coolers has as a result very heavy losses of this water during its circulation.

This apparatus has to be constantly watched which means increased work for the men in charge of the oven.

On the other hand none of this apparatus allows the recovery of the whole of the alcohol produced during the baking as the phlegms proceeding from the parts which contain most alcohol are allowed to escape from the plant and from the oven in spite of the fact that they still contain large amounts of alcohol which thereby go to waste.

Finally the escape of the vapors from the oven impairs the appearance and the quality of the bread.

This invention relates to devices which obviate all the above named disadvantages and which, on account of their peculiar combination, allow the recovery integrally and at a high grade of concentration of the alcohol evolved within the oven.

These devices require no watching and furthermore, by means of the continuous circulation of the vapors, they ensure a perfect baking of the bread and improve considerably its quality.

An embodiment of this invention is shown by the way of example on the accompanying drawings in which:

Figure 1 shows as a whole the devices applied to the outside of a baking oven;

Figure 2 shows separately a vertical section through an automatic throttle valve;

Figure 3 is a front view of the same and

Figure 4 is also a separate view of the automatic throttle valve controlling device.

As shown on said drawings, the device comprises a column 1 containing a coil 2 connected at its lower end with a pipe 3 which extends outside of the bakehouse and at its upper end with another pipe 4 ending in the chimney of the oven 5. This column has at its base an extension consisting of a ribbed pipe 6 connected with a pipe 7 provided with a cock 8 and whose opposite end enters the oven 5 over the floor. The ribbed pipe 6 is extended, beyond its connection with the tube 7, by means of a second tube 9 of smaller diameter connected at its lower end with a siphon consisting of a pipe 10 one end of which extends inside of the oven.

A pipe 11 branched upon the top of the column 1 connects the latter with a smaller column 12 containing metal or glass scraps, said pipe 11 ending at the bottom of the column 12.

The latter is the first of a series of other small similar columns 13 connected all with one another by means of pipes 14 arranged in the same way as the pipe 11 connecting column 1 to column 12.

Said column 12 as well as the columns 13 are connected by their lower end to a manifold 15 provided with cocks 16 between each of the columns 1, 12 and 13. This manifold is connected by one of its ends with the pipe 10 acting as a siphon and, at its opposite end, with the pipe 14 of the last column 13, a cock 16 being provided upon the manifold 15 between this last column and its pipe 14. The latter extends beyond its connection with the manifold 15 and advances into the chamber provided inside of a cooler 17. This chamber contains a coil 18 branched upon a pipe 19 which takes cold air from the outside of the bakehouse and supplies this air to said coil the outlet of which is connected with a pipe 20 whose one end enters the oven 5.

The lower end of the pipe 14 of the last column 13 which enters the room of the cooler 17 is connected to a box 21 with compartments 22 raising over its lower part, which compartments are situated between the rings of the coil 18. These compartments are connected by their base with the lower part of the box and they are divided in their middle by partitions 23 acting as baffles. The last compartment of the box 21 is connected with a tube 24 plunging in a depression tank 25 in which ends also the pipe 20.

A filter 26 is preferably placed at the bottom of the depression tank 25 at the junction of said tank with a tube 27 plunging in a tank 28 for the recovered condensed alcohol.

Through this tank passes a cold air suction pipe 29 branched at its outlet upon the pipe 20.

The assembly may finally comprise throttle valves closing automatically to the required extent during the passage of the alcohol in order to avoid the entrance of any steam.

These throttle valves consist of a stationary disc 30 (Figs. 2 and 3) and a rotatable disc in each of which are bored a series of radial holes and a circular hole.

These discs are arranged so that when the radial holes register with one another their circular hole is closed and vice versa.

The rotatable disc 33 is connected to a flattened tube 34 (Fig. 4) rolled in form of a spiral and connected at its center with a pipe on which is adapted a flexible link 35. The opposite end of the latter is connected with the spigot 36 of a fitting 37 by means of which this controlling device of the movable disc can be secured to the column 1 which collects the alcohol vapors proceeding from the oven.

A pipe 38 rolled as a coil spring or in form of a pod is fitted upon the spigot 36 and its opposite end plunges into the column.

As shown by the arrows (Fig. 1) the alcohol vapors evolved by the oven 5 during the baking of the bread escape from the oven through the pipe 7 and, passing through the ribbed pipe 6, reach the column 1 acting as a collector, the coil 2 of said column being supplied with cold air by means of the pipe 3 by reason of the draft of the chimney which is transmitted to the pipe 4.

The alcohol vapors travel then successively in each of the small columns 12 and 13 passing through the metal scraps or any other suitable scraps contained therein. They are thus led by the pipe 14 of the last column to the refrigerator 17. The alcohol then circulates without bubbling in the various compartments of the box 21 provided with baffles and reaches through the pipe 24 the depression tank 25. It then passes through the filter 26 and the tube 27 and reaches in condensed state the recovery tank 28.

The circulation of the cold air supplied by the pipe 19 in the refrigerator coil 18 and by the suction pipe 29 of the recovery tank is brought about by means of the pipe 20 which is under the influence of the draft prevailing the oven.

Anything that condenses in the column 1 returns directly to the oven through the pipe 9 and the pipe 10, while the condensate produced during the passage of the vapours through the columns 12 and 13 may be returned either to the cooler 17, by maintaining closed the cocks 16 of the collector 15, or to the oven 5, by means of the pipe 10 by opening said cocks.

On the other hand, the number of the small columns may be reduced by providing one or several of these columns with a system of refrigeration by circulation of cold air.

Besides the advantages of the combination of these devices as far as the complete recovery of the alcohol vapors is concerned the quality, the appearance and the duration of conservation of the bread in fresh state are enhanced to a large extent as the acids are carried away and as the bread only retains distilled water.

It is well understood that the apparatus herein disclosed and illustrated is given only by the way of example and that the construction, erection and dimensions may vary according to the nature of the ovens.

The pipes coming from or ending in the oven may be fitted either in the peeping hole or in any suitable place of the brick front.

What I claim is:

1. In combination with a baking oven having a baking chamber and provided with a chimney, a recovery system for alcohol comprising a cooling chamber positioned to receive the gases from the baking chamber of said oven, and an air cooling coil positioned inside said cooling chamber, said coil having one end in communication with the air and the other extremity in communication with said chimney, whereby the draft in the chimney, may operate to draw air through the cooling coil.

2. A structure as defined in claim 1 in combination with a plurality of air cooled chambers connected in series with said cooling chamber and receiving the vapors discharged therefrom.

3. A structure as defined in claim 1 in combination with an air-cooled chamber positioned to receive the vapors discharged from said cooling chamber, and a return conduit connected to said air-cooled chamber and having one extremity in communication with said baking oven, whereby the liquids condensed in said air-cooled chamber may be returned to the oven for redistillation.

4. A structure as defined in claim 1 in combination with a return conduit connected to said cooling chamber, said return conduit having one extremity in communication with the oven, whereby the liquid condensed in said cooling chamber may be returned to the oven for redistillation.

5. A structure as defined in claim 1 in combination with a condensing chamber positioned to receive vapors discharged from said cooling chamber, and a cooling coil positioned in said condensing chamber.

6. A structure as defined in claim 1 in combination with an air-cooled chamber positioned to receive vapors discharged from said cooling chamber, and a return conduit connected to said cooling and air-cooled chambers, said return conduit having one extremity in communication with the oven, whereby condensed liquids are returned to the latter for redistillation.

In testimony whereof I have signed my name to this specification.

NICOLAS DE NAVROTZKY.